(12) United States Patent
Heiler

(10) Patent No.: US 6,260,751 B1
(45) Date of Patent: Jul. 17, 2001

(54) ROOF RACK FOR PASSENGER CARS

(75) Inventor: Roland Heiler, Buxheim (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 0 days.

(21) Appl. No.: 09/243,680

(22) Filed: Feb. 3, 1999

(30) Foreign Application Priority Data

Feb. 3, 1998 (DE) .............................. 198 04 158

(51) Int. Cl.⁷ ................... B60R 9/00; B60R 9/04
(52) U.S. Cl. ............... 224/321; 224/315; 224/327; 224/314
(58) Field of Search .................... 224/321, 326, 224/320, 315, 316, 327, 314

(56) References Cited

U.S. PATENT DOCUMENTS

| 3,165,353 | * | 1/1965 | Weise | 224/309 |
| 4,997,227 | * | 3/1991 | Falzone et al. | 296/39.2 |
| 5,253,792 | | 10/1993 | Foster et al. | |
| 5,340,007 | * | 8/1994 | Jeuffray et al. | 224/321 |
| 5,470,003 | * | 11/1995 | Cucheran | 224/321 |

FOREIGN PATENT DOCUMENTS

| 37 19974 A1 | 12/1987 | (DE) . | |
| 3719974 | 12/1987 | (DE) . | |
| 38 26 662 A1 | 2/1990 | (DE) . | |
| 3904700 | * | 8/1990 | (DE) | 224/321 |
| 40 18 009 A1 | 12/1991 | (DE) . | |
| 4018009 | 12/1991 | (DE) . | |
| 0 411 988 A1 | 2/1991 | (EP) . | |
| 0411988 | 2/1991 | (EP) . | |
| 1 377 942 | * | 9/1964 | (FR) | 224/325 |
| 2 733 951 | 11/1996 | (FR) . | |
| 2733951 | 11/1996 | (FR) . | |
| 2 746 735 | 10/1997 | (FR) . | |

OTHER PUBLICATIONS

Abstract of JP 07–257285, Oct. 9, 1995, Patent Abstracts of Japan, (C) 1995, JPO.

* cited by examiner

Primary Examiner—Allan N. Shoap
Assistant Examiner—Tri M. Mai
(74) Attorney, Agent, or Firm—Crowell & Moring, L.L.P.

(57) ABSTRACT

A roof rack includes longitudinal members mounted on longitudinal sides of a roof of a vehicle body and is disposed in receiving devices such that the longitudinal members can be moved from a lowered position into an operative position and vice versa. End pieces of the longitudinal members, which rest in spaced receiving devices of the roof, are swivelled, for setting the operative position or the lowered position, outside the receiving devices and about an axis of rotation extending in the longitudinal direction of the vehicle. The end pieces are then inserted again in the receiving devices. Each of the end pieces is releasably connected with a respective longitudinal member.

16 Claims, 4 Drawing Sheets

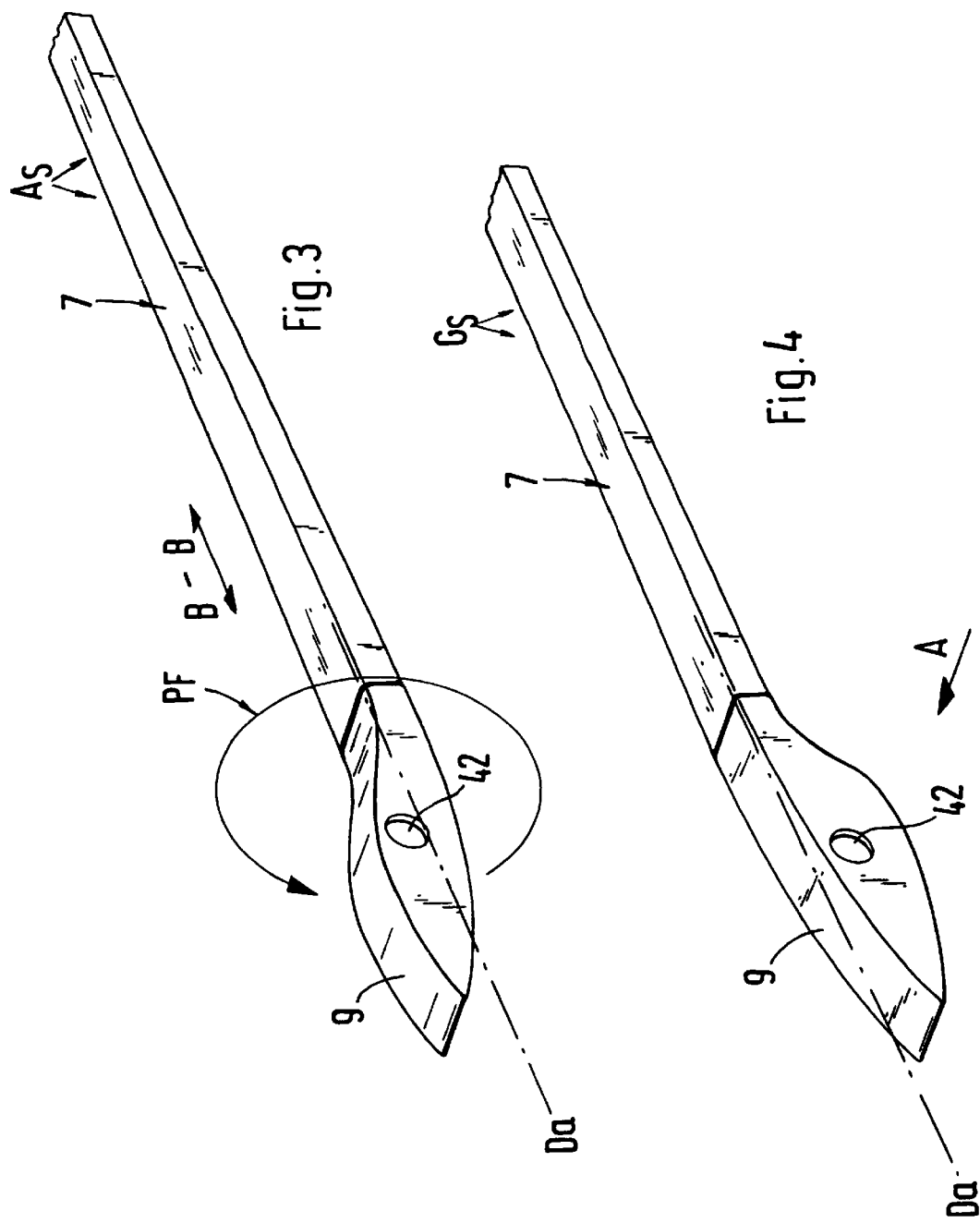

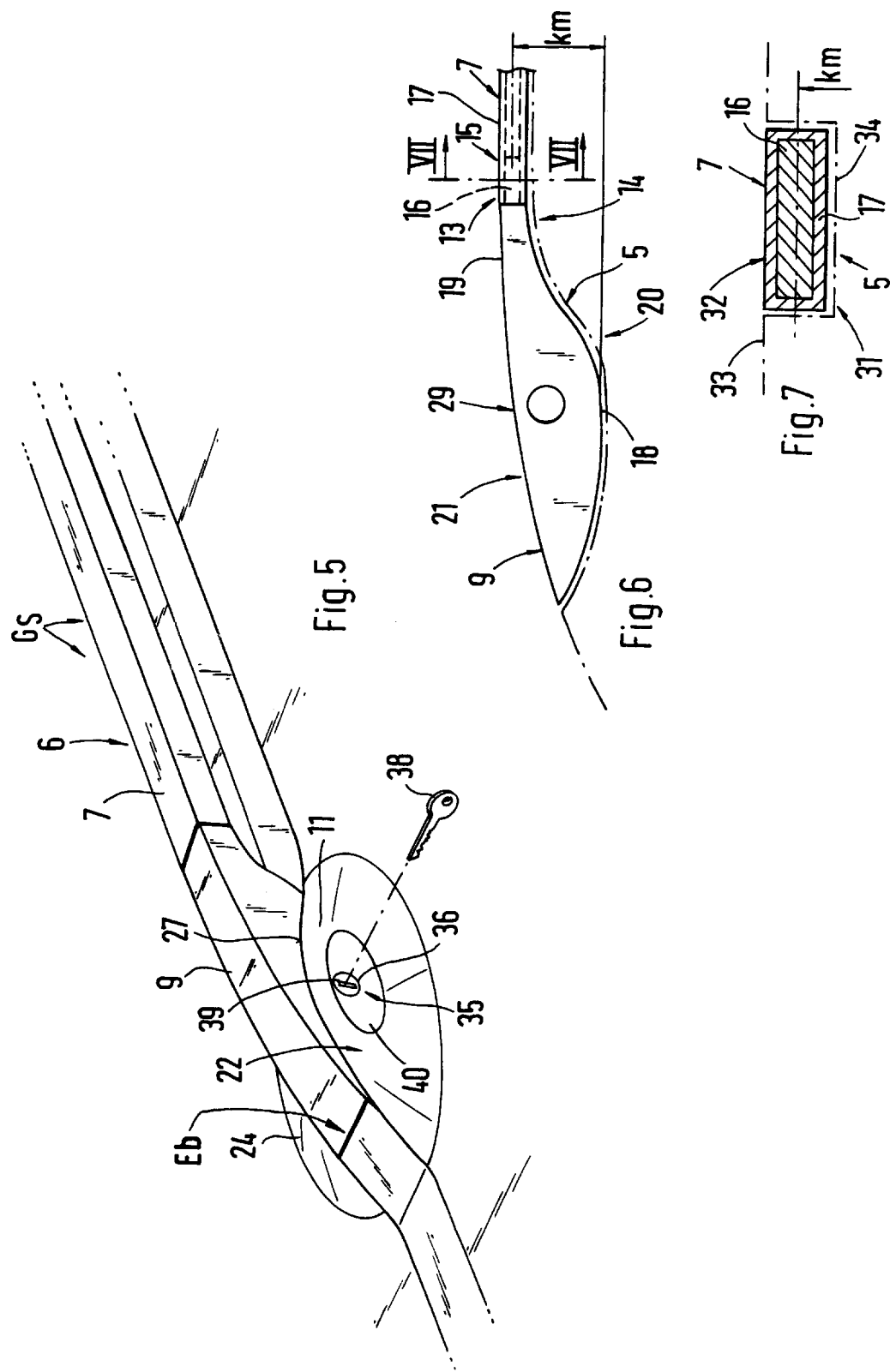

ROOF RACK FOR PASSENGER CARS

This application claims the priority of German patent application No. 198 04 158.6, filed Feb. 3, 1998, the disclosure of which is expressly incorporated by reference herein.

BACKGROUND AND SUMMARY OF THE INVENTION

The present invention relates to a roof rack for a passenger car having at least two longitudinal members which extend adjacent to longitudinal sides of a roof of the car body. The longitudinal members are disposed, by end pieces in spaced receiving devices, such that the longitudinal members can be moved from a lowered position into an operative position and vice versa.

In a roof rack known from U.S. Pat. No. 5,253,792, it is possible to move longitudinal and transverse members of the roof rack from a lowered position into an operative position and vice versa. However, this construction has the disadvantage that, in the lowered position, components of the roof rack project beyond the roof surface. This generates air flows which, on the one hand, impair the drag coefficient of the passenger car and, on the other hand, cause disturbing driving noises.

It is, therefore, an object of the invention to design the roof rack and the adjoining roof such that favorable aerodynamic conditions are achieved and disturbing approach flow noises are avoided during a driving operation, at least in the lowered position of the roof rack. The roof rack should also be simple to handle, and it should be possible to implement the constructive measures and the required components in a simple manner.

According to the invention, this object is achieved by the provision of longitudinal members, releasably connected with end pieces, which may be adjusted to set either an operative position or a lowered position above a vehicle roof by rotation performed outside of receiving devices of the roof. The longitudinal members are rotated about an axis of rotation aligned in the longitudinal direction of the vehicle and are then inserted into the receiving devices.

One principal advantage achieved by the invention is that, in the lowered position, the lateral longitudinal members of the roof rack are integrated and sunk into receiving devices of the roof. This improves the drag coefficient, reduces flow noises, and results in a special aesthetic effect. In addition, modification of the roof rack from the lowered position into the operative position and vice versa can be carried out with ease. In the operative position, at least the end areas of the end pieces are inserted into recesses of the receiving devices without projecting over the roof, creating a merging course between the end pieces and the roof. Finally, the shaped sections which form the receiving devices of the roof and which are situated on a lenticular shaping can easily be taken into account when designing a vehicle body.

BRIEF DESCRIPTION OF THE DRAWINGS

The drawings illustrate an embodiment of the invention which will be described in detail.

FIGS. 3, 4 and 5 are views corresponding to FIG. 2 showing a particular component of the rack;

FIG. 6 is a view in the direction of an arrow A of FIG. 4; and

FIG. 7 is an enlarged sectional view along line VII—VII of FIG. 6.

DESCRIPTION OF THE PREFERRED EMBODIMENTS

Figure 1:
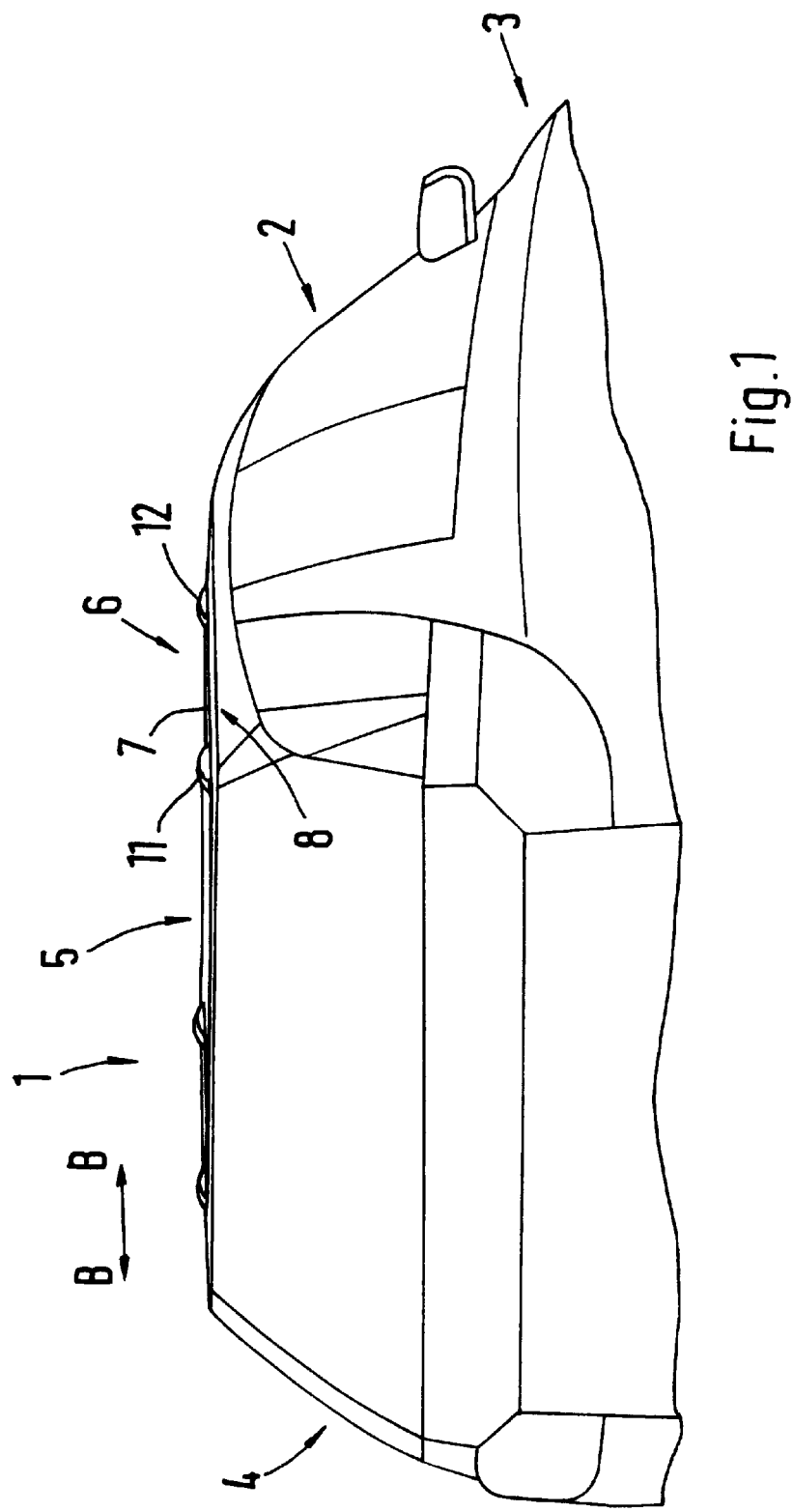
FIG. 1 is a diagonal view from the rear of a body of a passenger car.

FIG. 1 illustrates a passenger car 1 which includes a vehicle body 2 with a stepped front end 3 and an upright tail gate 4. A roof 5 of the vehicle body 2 is equipped with a roof rack 6 which has two longitudinal members 7, each of which extends adjacent to one of two longitudinal sides 8 of the roof 5. The longitudinal members 7 are provided with end pieces 9 and 10 which, when viewed in the longitudinal direction B—B of the vehicle, are disposed in spaced receiving devices 11 and 12.

Figure 2:
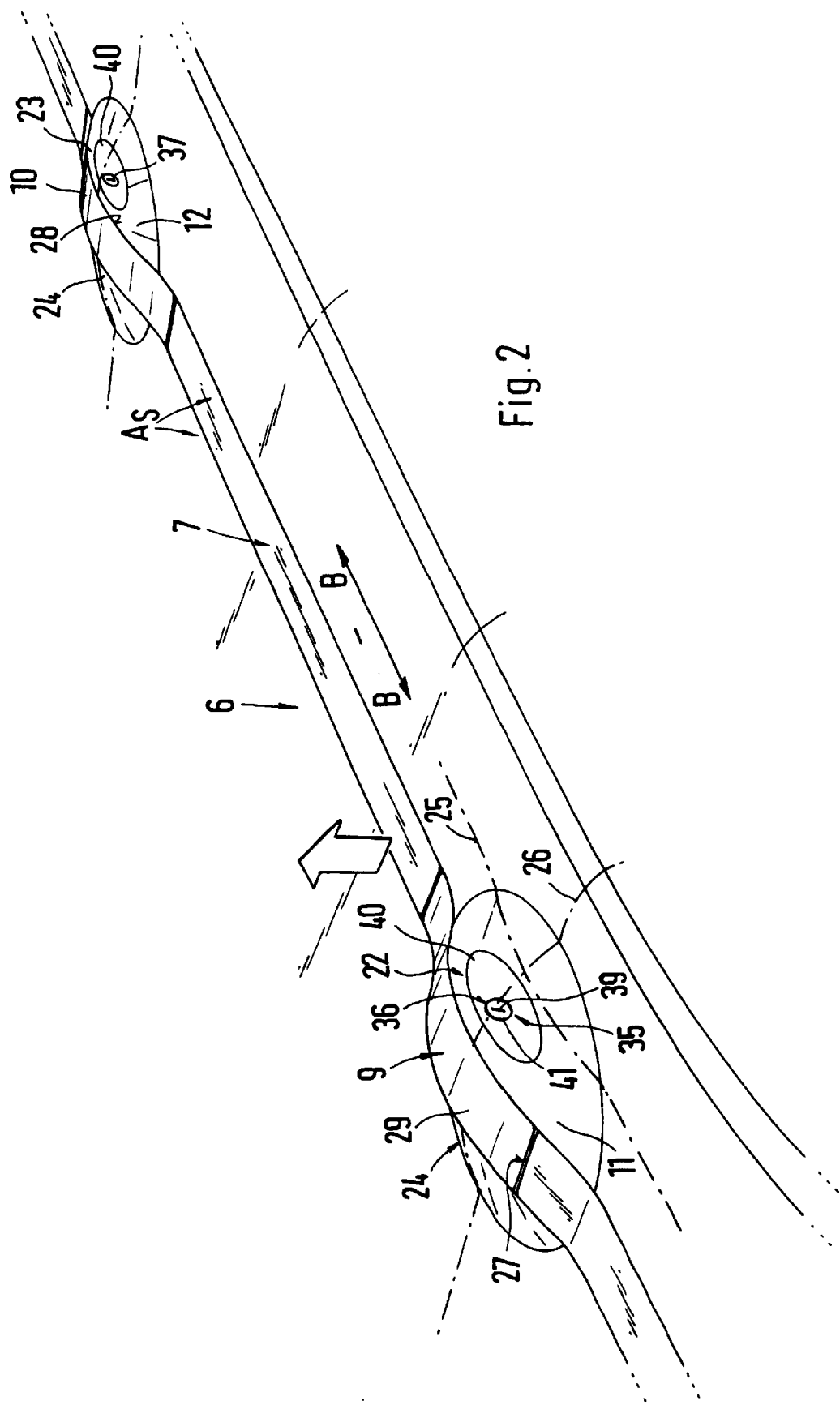
FIG. 2 is an enlarged partial view of FIG. 1.

The roof rack 6 is adjustable from a lowered position As, represented in FIGS. 1, 2 and 3, into an operative position Gs, represented in FIGS. 4 and 5, and vice versa. For this purpose, the end pieces 9 and 10 are detached from the receiving devices 11 and 12 and from the longitudinal members 7, rotated by 180° in the direction of the arrow PF shown in FIG. 3, and connected again with the longitudinal members and fastened in the receiving devices 11 and 12.

FIGS. 6 and 7 show that each longitudinal member 7 interacts with the end pieces by way of an easily releasable plug-type connection 13. The plug-type connection 13 has connection parts 14 and 15 which provide a form closure because of the rectangular cross-section and are formed by a pin 16 and a sleeve 17. In the illustrated embodiment, the pin 16 is part of the end piece 9 and the sleeve 17 is part of the longitudinal member 7.

The end piece 9 has a first base area 18 and a second base area 19, shown in FIG. 6, which bound opposite sides 20 and 21 of the end piece 9. The connection part 14 and the pin 16 are displaced at a right angle by the extent Km (extent of right bend) with respect to the first base area 18.

The receiving devices 11 and 12 are formed by convex shaped sections 22 and 23 of the roof 5. Each shaped section 22 rests on a lenticular shaping 24 of the roof 5 defined by shape lines 25 and 26 shown in FIG. 2. Shape line 25 extends in the longitudinal direction B—B of the vehicle, and shape line 26 extends transversely thereto.

In the shaped sections 22 and 23, recesses 27 and 28, shown in FIGS. 2 and 5, are provided. End pieces 9 and 10 are inserted into these recesses. In the lowered position As, the end pieces 9 and 10 are inserted in the recesses 27 and 28 in a completely sunk manner, with an exterior side 29 of these end pieces 9 and 10 extending flush with the surface with respect to the exterior shape of the shaped sections 22 and 23. In addition, in the lowered position As, the longitudinal members 7 are also arranged in the roof 5 in a fully sunk manner; for this purpose, the grooves 31, shown in FIG. 7, are molded into the roof 5. An exterior surface 32 of each longitudinal member 7 extends flush with the surface of the exterior side 33 of the roof. A support made, for example, of an elastic material may be provided between the longitudinal member 7 and the bottom 34 of the groove 31.

In the operative position Gs, shown in FIGS. 4 and 5, the end pieces 9 and 10 rest, on the end areas Eb facing away from the longitudinal member 7, also in a sunk manner in the receiving devices 27 and 28; that is, the end areas Eb extend flush with the surface of the exterior shape of the shaped sections 22 and 23.

A lock device is used for securing the roof rack 6 on the roof 5. This lock device 35 includes several locks 36 and 37. One lock, respectively, is provided for each receiving device such as the device 11. The lock 36 operates between the receiving device 11 and the end piece 9 and is locked by a key 38 which can be introduced into a closing cylinder 39. Finally, shaped-in areas 40 are provided in the shaped sections 22 and 23 in the area of the closing cylinder 39, and the closing cylinder 39 penetrates openings 41 and 42 in the shaped sections 22 and 23 and the end pieces 9 and 10.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Roof rack in a passenger vehicle, comprising:
   at least two longitudinal members which extend along longitudinal sides of a roof of the passenger vehicle, spaced receiving devices on the roof,
   end pieces configured with outer surfaces to be receivable in the spaced receiving devices such that the longitudinal members can be moved from a lowered position into an operative upper position and vice versa,
   wherein the longitudinal members are releasably connected with the end pieces in a direction along the longitudinal sides of the roof, which end pieces are rotatably adjustable for setting the operative position or the lowered position, by a rotating movement of the end pieces outside the receiving devices about an axis of rotation aligned in a longitudinal direction of the vehicle body such that a selected one of the outer surfaces faces the roof, and are then reinsertable into the receiving devices in the direction alone the longitudinal sides.

2. Roof rack according to claim 1, and further comprising plug-type connections by which the longitudinal members interact with the end pieces.

3. Roof rack according to claim 2, wherein the plug-type connections comprise form-closure-causing connection parts with rectangular cross-sections on the longitudinal members and the end pieces, said connection parts being formed by pins and sleeves.

4. Roof rack according to claim 3, wherein each end piece has a first base area and a second base area which bound opposite sides of the end piece, one of the connection parts on a side of one of the end pieces being displaced, at a right angle, by an extent from the first base area.

5. Roof rack according to claim 1, wherein the end pieces are rotated by 180° to set the operative position or the lowered position.

6. Roof rack according to claim 1, wherein the receiving devices are formed by convex sections of the roof.

7. Roof rack according to claim 6, wherein the convex sections are situated on a lenticular shaping of the roof.

8. Roof rack according to claim 6, wherein the convex sections have recesses into which the end pieces are inserted in a sunk manner.

9. Roof rack according to claim 6, wherein the end pieces rest, at least in the lowered position, fully sunk in the convex sections, an exterior side of each end piece being constructed to extend flush with an exterior shape of the convex sections.

10. Roof rack according to claim 9, wherein, in the operative position, the end pieces rest, by way of end areas facing away from the longitudinal member, in recesses and are aligned flush with a surface of the exterior shape of the convex sections.

11. Roof rack according to claim 1, wherein the longitudinal members are arranged in grooves of the roof essentially in a fully sunk manner.

12. Roof rack according to claim 1, and further comprising a lock device by which a constructional unit consisting of the end pieces and at least one of the longitudinal members can be fastened.

13. Roof rack according to claim 12, wherein the lock device has at least one lock for each longitudinal member, which lock operates between one of the receiving devices and one of the end pieces.

14. Roof rack according to claim 13, wherein one lock is provided on each of said receiving devices.

15. Roof rack in a passenger vehicle, comprising: a longitudinal member which extends on a roof of a body of the passenger vehicle, end pieces configured to receive ends of the longitudinal member, and having upper and lower outer surfaces of different configuration, and spaced receiving devices formed by convex sections of the roof by which the longitudinal member is disposed on the roof,
   wherein the longitudinal member is releasably connectable with the end pieces which have outer surfaces and is movable between an operative upper position and a lowered position by selectively rotating the end pieces so that one of the outer surfaces faces the roof, joining the end pieces and the longitudinal member together, and inserting the end pieces into the receiving devices.

16. Roof rack according to claim 15, wherein the convex sections have recesses into which the end pieces are inserted.

* * * * *